(12) United States Patent
Peterson

(10) Patent No.: US 6,169,937 B1
(45) Date of Patent: Jan. 2, 2001

(54) SUBBASE PROGRAMMABLE CONTROL SYSTEM

(75) Inventor: Mark W. Peterson, Annandale, MN (US)

(73) Assignee: Honeywell International Inc., Morristown, NJ (US)

(*) Notice: Under 35 U.S.C. 154(b), the term of this patent shall be extended for 0 days.

(21) Appl. No.: 09/059,914

(22) Filed: Apr. 14, 1998

(51) Int. Cl.[7] .................................................. G05B 23/00
(52) U.S. Cl. ...................................... 700/276; 361/733
(58) Field of Search ................................ 700/1, 19, 200, 700/207, 276, 277; 236/46 R; 361/679, 733; 62/163; 165/287

(56) References Cited

U.S. PATENT DOCUMENTS

| | | | |
|---|---|---|---|
| 4,235,368 | * 11/1980 | Neel | 236/46 |
| 4,245,308 | * 1/1981 | Hirschman | 700/89 |
| 4,702,305 | * 10/1987 | Beckey et al. | 165/12 |
| 5,065,813 | * 11/1991 | Berkeley | 165/1 |
| 5,161,606 | * 11/1992 | Berkeley | 165/1 |
| 5,203,497 | * 4/1993 | Ratz | 236/46 |
| 5,485,954 | * 1/1996 | Guy et al. | 236/78 |
| 5,622,310 | * 4/1997 | Meyer | 236/46 |
| 5,634,590 | * 6/1997 | Gorski et al. | 236/47 |
| 5,655,125 | * 8/1997 | Cloud | 713/300 |

* cited by examiner

Primary Examiner—Thomas C. Lee
Assistant Examiner—Albert Wang
(74) Attorney, Agent, or Firm—Robert B. Leonard

(57) ABSTRACT

A control unit such as a thermostat has a subbase which mounts on the surface holding the control unit and has electrical terminals for connecting to an operating unit. A controller is designed to mechanically attach and electrically interface to the subbase. The subbase has a memory unit which can record a number of different digital values. Each of these digital values corresponds to an operating unit requiring a different configuration of control algorithms. The controller receives the value recorded in the subbase memory unit and configures its control algorithms according to the value provided from the memory unit.

4 Claims, 2 Drawing Sheets

SUBBASE PROGRAMMABLE CONTROL SYSTEM

BACKGROUND OF THE INVENTION

Control units are frequently designed for controlling any of a variety of different operating systems. One example is certain types of thermostats available now which can be configured to control a variety of different HVAC units. HVAC systems have at least three major variants: those with heating only, those with both heating and air conditioning, and those with air conditioning only. Where heating is required, the heating units have a further set of variants— forced air or hydronic; combustion, resistance heating, or heat pump; one two or three stages. Where heat is provided by a furnace there are the further variants of natural gas, propane, or fuel oil types of fuel. There are variants of air conditioning units as well. Most of these combinations of variants require a different control algorithm in the thermostat. For example, where there is temperature setback in the control algorithm, the slower response of hydronic systems may require a substantially different algorithm than does a forced air system. Or the use of a heat pump for both air conditioning and heating will require an algorithm different from a conventional furnace and air conditioner.

In the past, a number of different approaches have been used to configure the thermostat for a particular system. One approach is to use the keyboard of the thermostat to enter the particular variants manually. Another is to have switches accessible to the installer who then sets the switches to properly configure the thermostat to the heating unit characteristics. These switches may be screws which are turned to make or break contacts or simply DIP switches which are set by shifting the position of small slides or levers.

I have found that either keyboard entry or switch setting tends to result in configuration errors by the installers. Making this observation is not meant to suggest incompetence on the part of installers. Contrariwise, it simply reflects the human tendency of making mistakes when performing any type of programming task, even the most simple. Considering the number of variables present, setting the configuration of a thermostat control algorithm is not a simple task. The problem is complicated by the fact that there is no prompt and unequivocal feedback which confirms that the configuration is correct, or indicates when it's not. That is, the system may seem to operate correctly during a few minutes of observation, but then fail when an anomaly occurs which wasn't present during the observation interval. Further, there is a certain amount of time required to set a number of different switches or firmware flags which adds to overall installation cost.

Accordingly, there is a need for a mechanism different from those available now for configuring control units such as thermostats to match the requirements of the operating (HVAC) systems which they control. Such a mechanism should be easy to implement and should be as cheap or cheaper than those now in use.

I have noted that certain control units, notably thermostats, use a separate base (called a subbase in thermostat nomenclature) to mount the control system. In thermostat systems, the subbase is attached to the wall of the room whose temperature is to be controlled. In most subbase arrangements the wires from the HVAC unit(s) are connected to terminals on the subbase. The subbase has built-in connections between these terminals and contacts or connectors in the subbase designed to mate with cooperating contacts or connectors on the thermostat body itself. These connectors are arranged so that the act of mounting the thermostat body on the subbase automatically connects the thermostat electrically to the HVAC wires through the subbase. Experience shows that attaching the subbase is relatively easy. The thermostat body mounts with a detent or latch mechanism to the subbase which can be overcome when removing the thermostat body. The thermostat body covers the subbase, concealing the mounting screws and providing a finished appearance to the installation. These subbases are relatively cheap to produce, and the convenience in mounting the thermostat body more than compensates for the additional cost of the subbase.

BRIEF DESCRIPTION OF THE INVENTION

Applicant has developed a system by which control units such as thermostats can by using the proper one of a number of different subbases be configured to control any of a number of different operating system configurations without complicated programming. Such a control unit provides a control signal suitable for controlling any one of a plurality of different operating systems after configuration according to my invention. The particular operating system receives a control signal generated by operation of the control unit by processing one of a plurality of data sets comprising at least one of instructions and data parameters recorded within and processed by the control unit and assigned to said system.

Such a control unit comprises a base for supporting a controller such as a thermostat. This base has a preselected mechanical attachment structure, a first connector half having a plurality of first conductor halves, and a first memory unit recording one of a plurality of possible predetermined digital values. Each value has associated with it a predetermined one of the instruction sets. The first memory unit is operatively connected to the first conductor halves in the first connector half so that the digital value is available on the conductor halves.

The controller has a second connector half for mating with the first connector half and has a plurality of second conductor halves forming electrical connection with the first conductor halves when the connector halves are mated. The controller has a housing for mating with the base's mechanical attachment structure and when so mated being held by the base with the second connector half mated with the first connector half. The controller further includes i) a second memory unit in which is recorded each of the instruction sets, ii) a processor having a data port and processing data sets provided in an data signal from the memory unit, and iii) a selector unit connected to the first memory unit through the connected conductor halves in the mated connector halves. The selector unit receives through the connected conductor halves, the digital value recorded in the first memory unit. The selector unit is connected to the second memory unit to receive therefrom a memory signal encoding the instructions and data values encoded in the data sets. The selector unit provides to the processor's instruction port a data signal encoding the instructions and data parameters in the data set associated with the digital value received from the first memory unit. In this way, the control unit supplies control signals to the operating system which are compatible with the configuration of the operating system.

DESCRIPTION OF THE PREFERRED EMBODIMENTS

Figure 1:
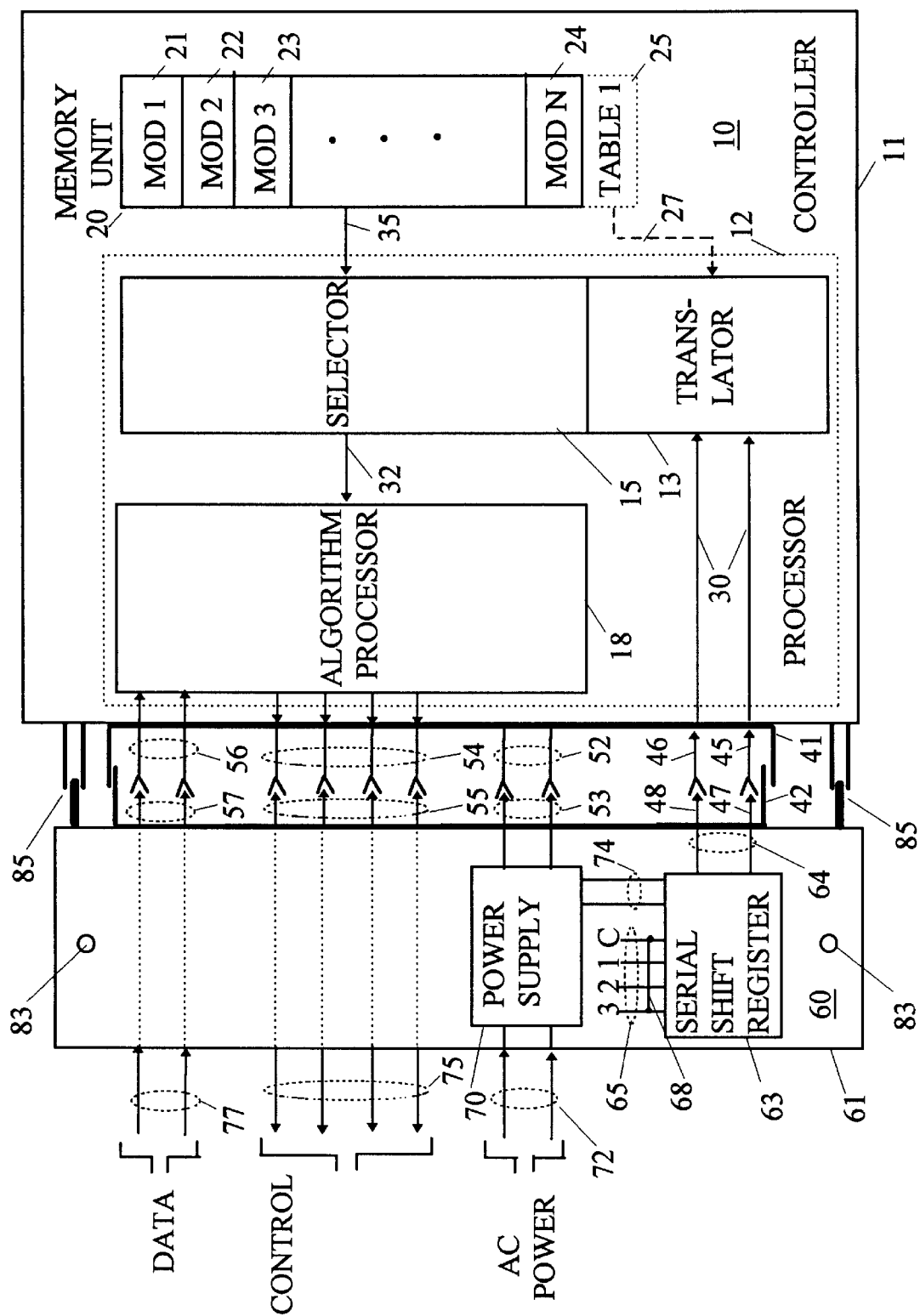
FIG. 1 is a combined electrical and mechanical block diagram of a preferred embodiment having serial transmission of the configuration data from the subbase to the control unit

FIG. 1 is diagram of a control unit such as a thermostat incorporating this invention and illustrated as a number of electrical and mechanical blocks. The actual physical structure of the various electrical and mechanical components of such a device are well known to those familiar with control units such as thermostats. Presenting the features of the invention in the block diagram format seems to be an effective way to show the relationships among these elements.

FIG. 1 shows the control unit as having two major elements, the controller 10 and a base comprising the subbase 60. Subbase 60 is designed to be permanently attached to a support which if the control unit is a thermostat, will typically be a wall. Subbase 60 includes a plate or base 61 on which its various components are mounted. There may be mounting holes 83 for attaching subbase 60 to a wall or other surface. In one embodiment there is a pair of data paths 77 and a number of control paths 75 which are connected to designated terminals carried on base 61. For a thermostat type control unit the data may be provided by a temperature sensor and the control paths provide control signals to HVAC equipment. A pair of AC power conductors 72 are connected to a pair of input power terminals carried on base 61 and which are connected to input power terminals of a power supply 70. Power supply 70 provides operating DC power of appropriate voltages to connector halves 53 and on paths 74 for a serial shift register 63 forming a part of subbase 60.

Register 63 has inputs connected to a number of jumpers 65 which with one or more shunts 68 collectively form a first memory unit. This memory unit has a very small capacity, in this example just three bits, but which is still sufficient to configure the control unit for a number of different operating system configurations. The data recorded by jumpers 65 arises from the configuration of shunts 68. By connecting a numbered jumper to the common (C) jumper with a shunt 68, that bit can be interpreted by register 63 to have a value, say zero, different from the value, say one, which an unshunted jumper 65 represents. Register 63 is a common serial shift register drawing operating power from power supply 70 on paths 74. Register 63 provides a serial message on data paths 64 which encodes the data recorded by jumpers 65.

Subbase 60 further includes a first connector half 42 having a plurality of first conductor halves 47, 48, 53, 55, and 57. Connector half 42 may be a separate element mounted on the base 61, or may be formed as integral features of base 61. First connector half 42 and its first conductor halves are configured to mate respectively with a second connector half 41 and the second conductor halves 45, 46, 52, 54, and 56, all as implied by the juxtapositions shown in FIG. 1.

Controller 10 includes a housing 11 on which is mounted the second connector half 41. The positions of detents 85 and connector halves 41 and 42 are such that all of the conductor halves connect to each other as shown in FIG. 1 when controller 10 is mounted on subbase 60. This electrical and mechanical connectivity between the subbase 60 and housing 11 is standard for many types of thermostats now available.

Controller 10 includes a processor 12 which comprises a microcontroller designed to execute instructions provided by a memory unit 20. A memory unit 20 has recorded in it instructions and data for supporting a number of different algorithms for controlling a number of different operating system configurations. Memory unit 20 is conceptually arranged in a number of modules 1, 2, 3, N and having reference numbers 21–24. Each module 21–24 comprises the memory locations or cells recording an instruction set, data, or a combination of both which when processed by processor 18 provides the algorithm or one of the algorithms required for properly controlling one or more of the operating system configurations.

Although processor 12 is shown in FIG. 1 as comprising a number of discrete physical blocks, I expect that the processor 12 will be implemented in a microprocessor or microcontroller which may even have within its physical package memory unit 20 as well as the elements of processor 12. It is helpful to briefly review the structure of a microprocessor so as to understand that an implementation of a particular set of control algorithms within a microprocessor by an application program bears strong structural similarities to a hardware implementation of that same set of control algorithms. Each of the functional elements which a hard-wired or other dedicated implementation requires has its exact physical analog in a microprocessor-based software implementation. Registers, signals, logic and arithmetic elements, etc. all are present in a microprocessor implementation. The microprocessor, or parts of it, sequentially becomes first one and then another of these essential elements. Signals are provided to and from each of these elements by the simple expedient of storing in the microprocessor's on-board memory in some way, the information content of each signal. Thus, the control algorithms when operating within a microprocessor, conforms the microprocessor to the hardware version in a way which corresponds almost exactly.

One should also note that even instructions and data by which a set of control algorithms is performed in a microprocessor have a physical existence. Within the microprocessor, the presence of these instructions and data causes small but easily detectable physical changes in the memory unit 20. This physical state of the microprocessor's components is no less susceptible to treatment under the patent laws than is a device comprising larger discrete components easily visible to the unaided eye. There is no requirement in the patent laws that individual physical components of an invention have a minimum physical size or a particular physical format. Nor is there any requirement in the patent laws that all of the components of an invention exist simultaneously. That is, the microprocessor while executing instructions and processing data and sequentially becoming first one and then another of the components of an invention, can all by itself constitute a physical embodiment of the invention. No further notice will be taken of this equivalence between microprocessor and discrete component implementations of an invention, but the invention will be described in terms of its physical elements to the extent possible. One should note that a person of skill in the programming arts can easily devise appropriate software to cause the operation of a microprocessor to implement a set of control algorithms.

I should also mention that some of the invention's components formed within or by the microprocessor are not known by any accepted English (or other) language term, nor are they available as a commercial product. For example, the algorithm processor 18 has specific functions and operations which vary depending on the type of operating systems controlled. The reader should also understand that there are many different structures which can in fact serve these types of generalized functions. Where such terms are used in this description and also in the claims, I intend the term to cover any type of structure or collection of hardware and software elements which serves the stated function.

Controller 10 may have a number of elements which are not shown in FIG. 1 because they do not form a part of this invention. For example, if the control unit of FIG. 1 is a thermostat, there would most likely be a keyboard for entering user selected set point and time information, and a small display window for informing the user of the current status of the operating system and the control unit. There probably would be a temperature sensor as well.

Processor 12 is shown as comprising a translator 13, a selector 15 and an algorithm processor 18. All of these components are typically implemented in software or firmware within processor 12. Memory unit 20 is shown as external of processor 12, but typical microprocessors which can comprise processor 12 have an on-board RAM for temporary data and instruction storage, and may have an on-board ROM as well in which some instructions and data may permanently recorded.

Processor 12 is shown as comprising a translator 13 which is electrically connected by serial path 30 to second conductor halves 45 and 46. Translator 13 includes a table which associates each of the data values provided on path 30 from memory unit 65 with a unique permutation of modules 21–24. The following Table 1 is exemplary only. For purposes of understanding the information presented in Table 1, assume that there are five different operating system configurations and 10 different modules 21–24, i.e., there are modules 1 through 10.

TABLE 1

| Path 30 Data | Designated Modules |
|---|---|
| 0 | 2, 5, 8, 9 |
| 1 | 1, 5, 8 |
| 2 | 1, 2, 4, 5 |
| 3 | 3, 6, 9 |
| 4 | 2, 7, 8, 9, 10 |

The association of path 30 data with modules is purely arbitrary and the choice of the designer. I contemplate that individual subbases 60 will be sold with the operating system configuration designation printed on the package, so that the installer or operator can simply pick the one of the relatively inexpensive subbases which is designed to configure the controller 10 operation for the operating system it controls.

Translator 13 has recorded within itself (or can receive from the optional Table 1 module 25 of memory unit 20 via data path 27) the data shown in Table 1. For each of the data values shown, the designated modules in memory unit 20 provide the data and instructions which algorithm processor 18 uses for controlling the operating system. Translator 13 controls the actions of selector 15 in receiving the data and instructions from the designated modules of memory unit 20 on path 35 and transferring the data and instructions to processor 18 on path 32. Processor 32 then executes the instructions received on path 32 and uses the data parameters also included, to control the operation of the particular operating system. These control signals are provided to conductor halves 54 and 55, and to terminals 75, which connect to the operating system.

Figure 2:
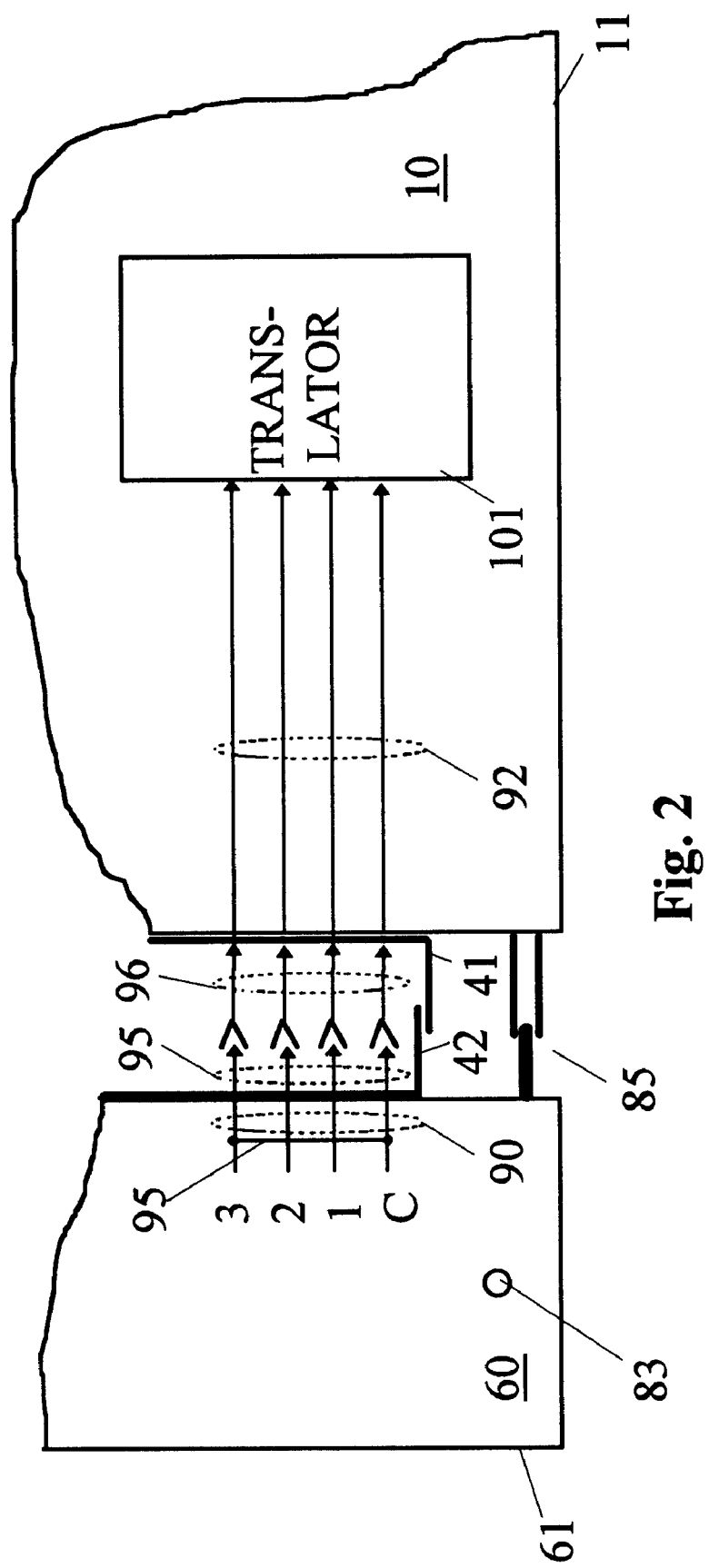
FIG. 2 is a combined electrical and mechanical block diagram of a variation to the embodiment in FIG. 1 having parallel transmission of the configuration data from the subbase to the control unit.

FIG. 2 shows a variation on the data path connecting the subbase 60 memory unit to controller 10, where the data path is parallel, and the individual data values in a subbase memory unit comprised of jumpers 90 and shunt 98 are all transferred simultaneously. This data is transferred via first conductor halves 95 to second conductor halves 96, and to parallel data path 92 to a translator 101 which is very similar to translator 13 of FIG. 1, but does not need to convert serial data to parallel. The advantages of the FIG. 2 configuration is that the data is constantly available on path 92 and there is no need to convert the data values in the subbase memory from parallel to serial in the subbase and back to parallel from serial in translator 101. But this embodiment does require extra conductor halves 95 and 96, and it turns out that these conductor halves 95 and 96 may be more expensive than a simple serial shift register. The power supply 70 of FIG. 1 is needed in any case, so that locating it in the subbase 60 is hardly a disadvantage. In fact, in the thermostat case, locating the power supply 70 in the subbase 60 may be an advantage because this may place it further from the temperature sensor which often is a part of controller 10. The power supply 70 is typically a large heat generator which may cause inaccuracy in temperature sensing.

There are many variations on the invention as disclosed above. One for example places only data in memory modules 21–24. In this variation, algorithm processor 18 has resident instruction sets which vary their operation on the basis of the data sets transmitted to processor 18 by selector 15 responsive to the data provided on data path 30.

I wish to include all of these in the claims which follow.

I claim:

1. A control unit for providing a control signal suitable for controlling any one of a plurality of different operating systems requiring a different control algorithm, each operating system to receive a control signal generated by operation of the control unit by processing of one of a plurality of data sets comprising at least one of instructions and data parameters recorded within and processed by the control unit and assigned to said operating system, said control unit comprising:

a) a base for supporting a controller, said base having a preselected mechanical attachment structure, a first connector half having a plurality of first conductor halves, and a first memory unit recording a single one of a plurality of available digital values and in electrical connection with the first conductor halves, each digital value having associated with it a predetermined one of the instruction sets; and b) a controller having a second connector half for mating with the first connector half and having a plurality of second conductor halves forming electrical connection with the first conductor halves when the connector halves are mated, and a housing for mating with the base's mechanical attachment structure and when so mated being held by the base with the second connector half mated with the first connector half, said controller further including i) a second memory unit in which is recorded each of the data sets, ii) a processor having an data port and processing data sets provided in an data signal from the memory unit, and iii) a selector unit connected to the first memory unit through the mated connector halves and receiving therefrom the digital value recorded in the first memory unit, and connected to the second memory unit to receive therefrom a memory signal encoding the instructions in the instruction sets, and providing to the processor's data port a data signal encoding the data in the data set associated with the digital value received from the first memory unit.

2. The control unit of claim 1, wherein the connected first and second conductor halves together comprise a serial data path, and wherein the first memory unit comprises a plurality of jumpers having a plurality of possible configurations, each configuration encoding a single one of the predetermined digital values, and a serial shift register in operative connection to the jumpers, and providing to the conductor halves in the first connector half a serial signal encoding the predetermined digital value.

3. The control unit of claim 2, wherein the subbase includes a power supply connected, to a plurality of first conductors halves, and connected to power terminals of the serial shift register.

4. The control unit of claim 1, wherein the first memory unit comprises a plurality of jumper terminals, each jumper terminal in electrical connection to one of the first connector half conductors, and at least one conductive jumper connecting at least two jumper terminals.

* * * * *